March 10, 1964 — L. E. SWINNEY — 3,124,007
AUTOMATIC STABILIZATION SYSTEM FOR UNSTABLE VEHICLES
Filed Feb. 13, 1961 — 3 Sheets-Sheet 1
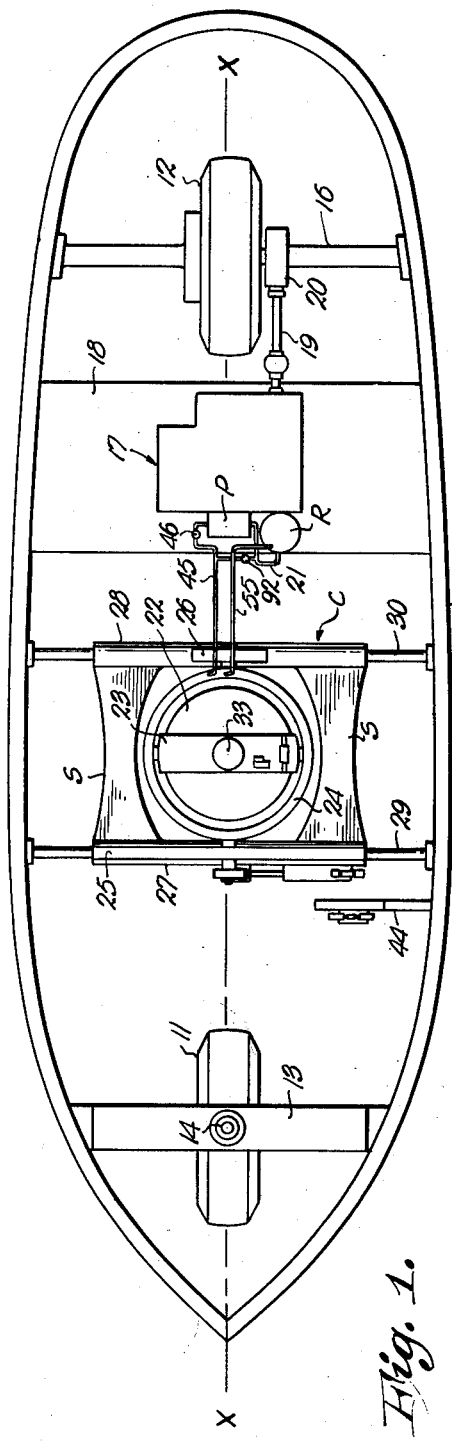
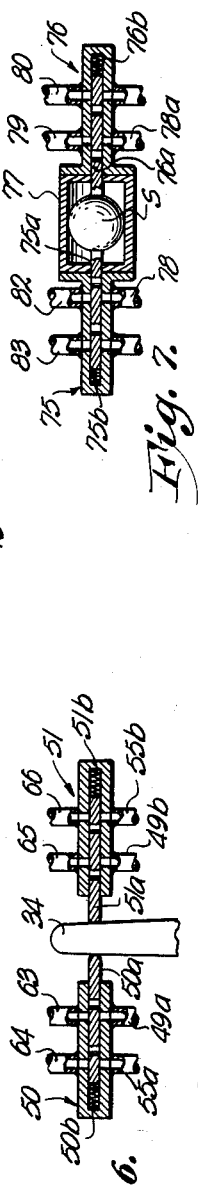
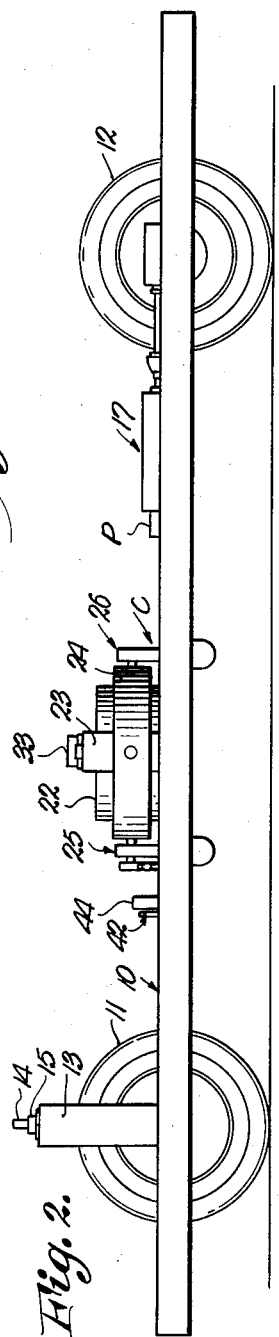
INVENTOR.
Louis E. Swinney
BY
ATTORNEY.

March 10, 1964 L. E. SWINNEY 3,124,007
AUTOMATIC STABILIZATION SYSTEM FOR UNSTABLE VEHICLES
Filed Feb. 13, 1961 3 Sheets-Sheet 2

INVENTOR.
Louis E. Swinney
BY Thos. E. Scofield
ATTORNEY.

March 10, 1964 L. E. SWINNEY 3,124,007
AUTOMATIC STABILIZATION SYSTEM FOR UNSTABLE VEHICLES
Filed Feb. 13, 1961 3 Sheets-Sheet 3
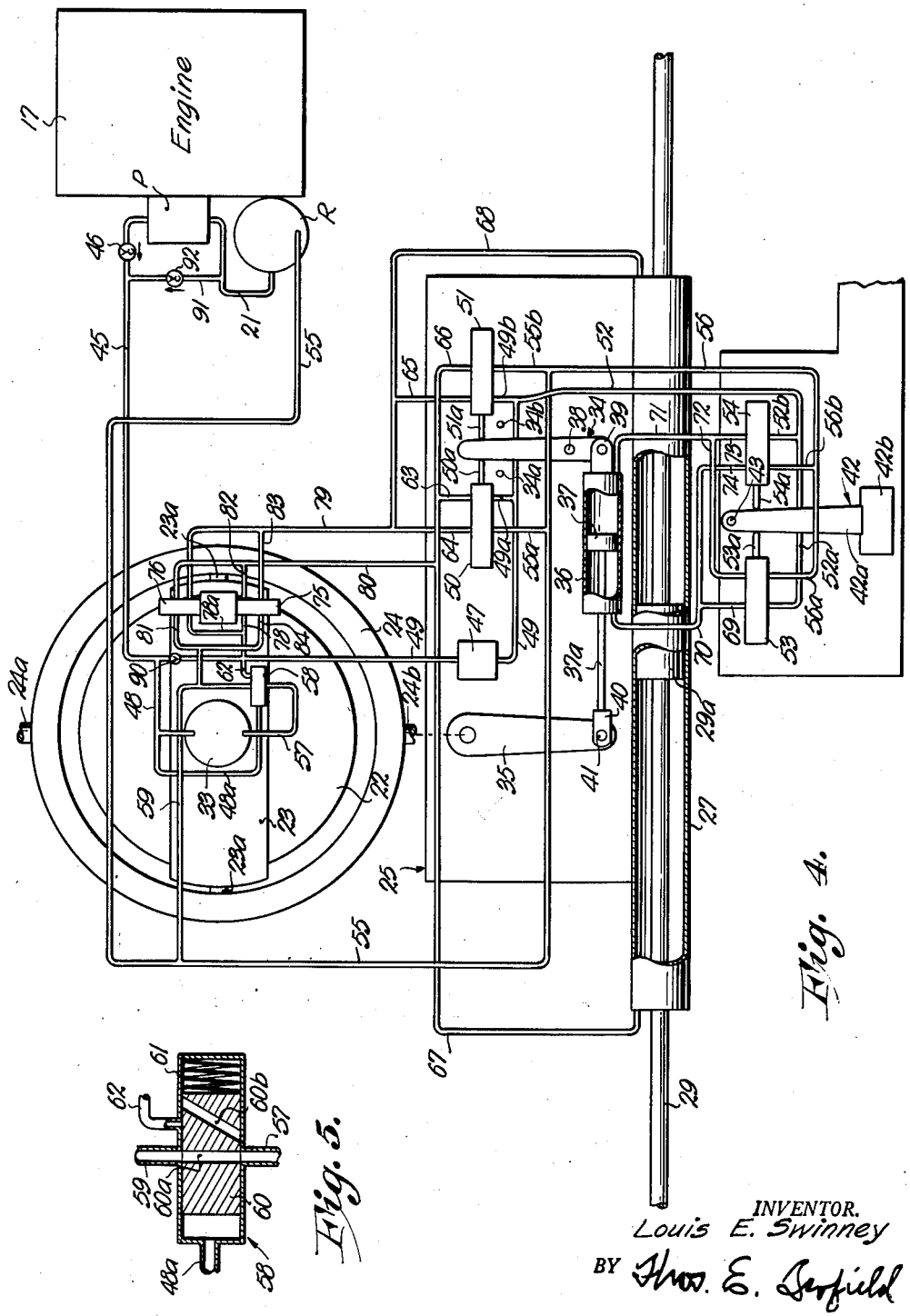
Fig. 4.
Fig. 5.
INVENTOR.
Louis E. Swinney
BY 
ATTORNEY.

1

3,124,007
AUTOMATIC STABILIZATION SYSTEM FOR UNSTABLE VEHICLES
Louis E. Swinney, 2701 Oak Grove, Kansas City, Kans.
Filed Feb. 13, 1961, Ser. No. 88,971
16 Claims. (Cl. 74—5.22)

This invention relates generally to the automatic and continuous stabilization of bodies subject to statically unstabilizing forces tending to deflect the body from a preselected orientation, and refers more particularly to apparatus for incorporation with such a body and operable to effect the static stabilization of the body in such orientation in response to the application of such forces.

By way of example but without any intent to limit the application of the invention, the apparatus herein disclosed and claimed finds particular usefulness in its application to the control and balancing of tandem two wheel vehicles such as two wheel automobiles or monorail cars.

For many years efforts have been made to provide two wheel vehicles which incorporate a balancing mechanism operable to apply compensating forces which will maintain the vehicle in an upright position. Generally such systems have employed as the source of the compensating force one or more gyro wheels so disposed as to take advantage of the precessional torque of the gyro wheel to supply the neutralizing moment on the vehicle. So far as I am aware, in all systems suggested thus far for causing the body to right itself after becoming tilted from the vertical, or to resist the forces tending to tilt it, the phenomena relied upon is acceleration of the velocity of precession of the gyro wheel spin axis. The differences in the various schemes have been in the number of gyro wheels employed, the direction of the spin axis relative to the rail or normal path of advance of the body, and in the methods used to produce the acceleration of the spin axis about the axis of precession. However, all of these systems are subject to one or more of the following shortcomings, among others; (1) the gyro wheel or wheels were so mounted on the body as to produce undesired restraining forces which interfered with the ability of the unit to freely negotiate turns or curves or to ascend and descend grades; (2) the connections mounting the gyro wheel to the frame of the body were required to carry the full stresses imposed by the neutralizing moments, since the stabilizing forces were all generated within and by the gyro mechanism; (3) the overloading of one side of a system that is statically unstable, but that has been rendered dynamically stable by means of a spinning gyroscope, causes the overloaded side to rise and the center of gravity to oscillate across a vertical line through the point of support for the system; (4) difficulties were encountered in attempting to provide for natural and immediate inward lean of the vehicle on curves and during turns, and (5) the response time of the dynamic balancing torque resulting from the gyro was too long.

One of the principal objects of the present invention is to provide apparatus for maintaining a body in a preselected orientation despite varying unbalancing forces applied thereto which overcomes each of the problems noted above. Through my invention I provide a stabilization system in which balance is achieved through the automatic adjustment of the weight distribution within the body relative to the center of support to cause moments about the support center which counteract those created by the variable forces which may be applied to the body. It is a feature of the invention that while I employ a gyro wheel as a principal element in the stabilization system, the gyro wheel is supported for free precession and therefore operates in a fundamentally different fashion from the gyro wheels of systems which have preceded.

A further object of the invention is to provide a stabilization apparatus of the character described in which the adjustment of the weight distribution to neutralize unbalancing moments is accomplished substantially instantaneously and upon only a slight departure of the body from the preselected orientation. In my invention the stabilizing force is not a function of the velocity of precession of the gyro, but instead is a function of the relative movement between the body and the gyro spin axis and is caused immediately upon said relative movement. A feature of the invention in this respect is that once stabilization under a given pattern of forces is achieved, the torque on the gyro axis is removed. So long as no new forces are applied, the gyro mechanism is maintained in standby status, that is, the gyrodynamic forces are not relied upon to maintain the condition of balance except to the extent of providing the minimal forces necessary to resist departure from the stabilized condition.

Still another object of the invention is to provide a stabilization system for the purposes set forth in which the gyro wheel is mounted for shifting movement transverse to the support center and which includes means responsive to the application of an unbalancing moment to the body to effect shifting of the gyro wheel and its supporting or carrying structure in a direction to produce a neutralizing moment about the support center. It is a feature of the invention in this respect that during operation the gyro spin axis remains substantially fixed in a preselected reference plane or a plane parallel thereto and that this is true for any operational attitude of the body or vehicle.

Still another object of the invention is to provide stabilization apparatus for the purposes set forth which includes means operable in response to arcuate translation of the vehicle to cause controlled leaning of the vehicle toward the inside of the arc and which does not depend upon nor require accompanying precession of the gyro spin axis. Among the main advantages of this feature of the invention is the fact that leaning is effected immediately in response to the creation of the centrifugal force and that the gyro mechanism remains ready at all times to effect stabilization in the event the force pattern changes while the vehicle is in the leaning attitude. A further feature of the invention in this connection resides in the manner in which the vehicle is moved to and maintained in a leaning position which is a function of the degree of the curve and the velocity of the body therethrough.

A further object of the invention is to provide stabilization apparatus of the character described in which the gyro spin axis is so controlled as to be maintained in a vertical plane at all times and which includes means operable to return the gyro spin axis to the vertical following each change in the balance of the vehicle.

Still another object of the invention is to provide a stabilization system in which the inertia of the spinning gyro wheel is utilized to effect operation of the system in the event of loss of driving power to the gyro wheel in order to prevent immediate failure of the system and consequent permanent static instability of the body.

Additional objects of the invention are to provide a stabilization system of the character described which, by virtue of the principles involved, makes possible the effective stabilization of vehicles with a smaller gyro wheel than heretofore thought possible; which makes it possible to hold the over-all weight of the vehicle to within practical limits; which lends itself to ready application to a wide variety of vehicles and crafts; which requires little power to operate; and which can be constructed and operated at relatively low cost.

Other and further objects of the invention together with the features of novelty appurtenant thereto will appear in the course of the following description.

In the accompanying drawings which form a part of the specification and are to be read in conjunction therewith, and in which like reference numerals indicate like parts in the various views;

FIG. 1 is a somewhat schematic top plan view of a two wheel tandem vehicle embodying a preferred form of the present invention;

FIG. 2 is a side elevation taken from the near side of FIG. 1;

FIG. 4 is a diagrammatic showing of the hydraulic system and associated components of the stabilization system;

FIG. 5 is an enlarged fragmentary cross section through one of the control valves employed in the system;

FIG. 6 is an enlarged fragmentary and somewhat schematic cross section showing the main balance control valves for the system; and FIG. 7 is an enlarged fragmentary cross section showing the top mounted precession valve assembly.

Figure 3:
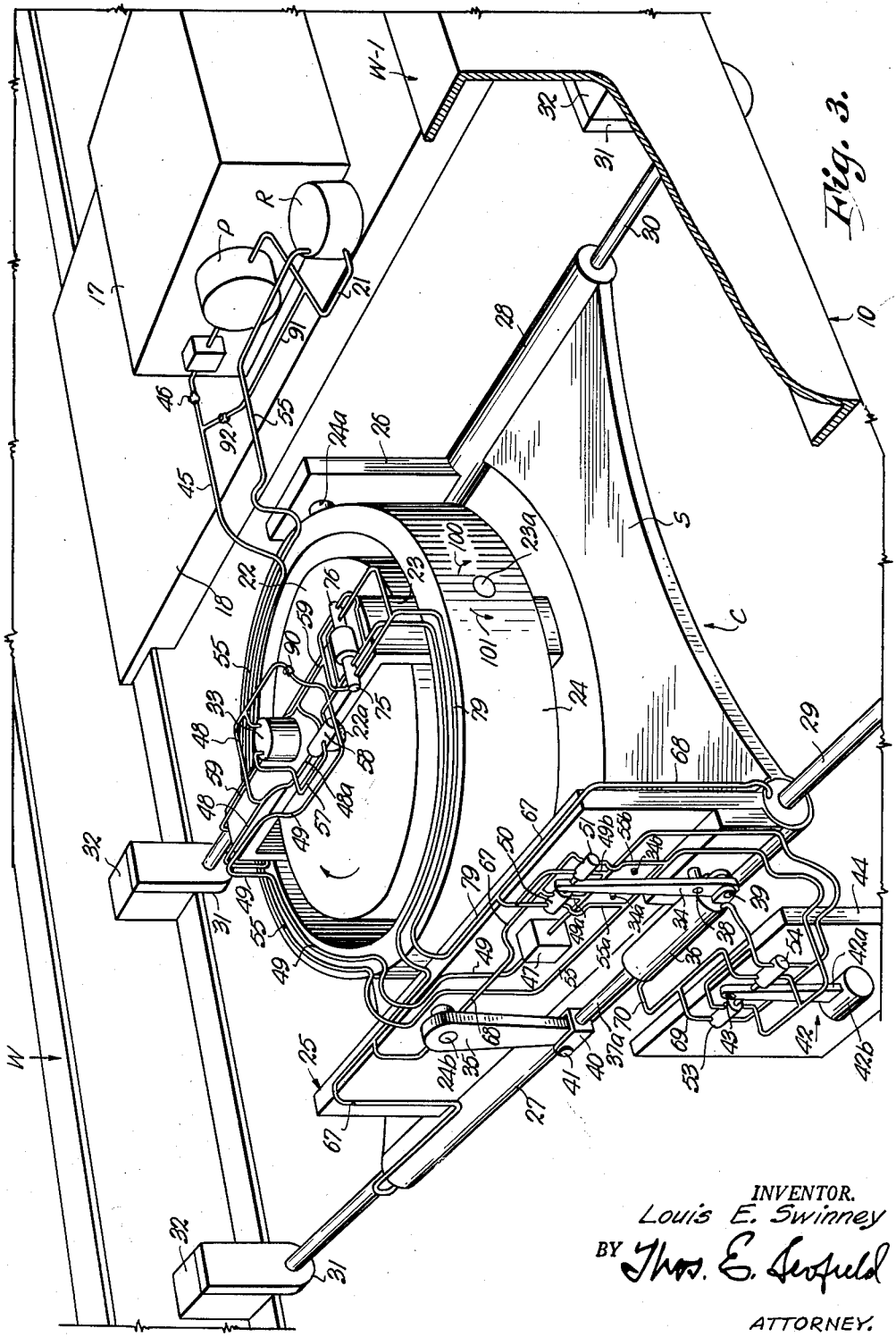
FIG. 3 is an enlarged fragmentary perspective view of the central portion of the vehicle illustrating the general arrangement of the stabilizing apparatus.

Referring now to the drawings, and initially to FIGS. 1, 2, and 3, for purposes of illustration of the invention it is shown as applied to a skeleton tandem two wheel vehicle. The frame of the vehicle is indicated generally by reference numeral 10, and the frame is supported by the front and rear wheels 11 and 12, respectively. The front wheel is connected with an inverted U-shaped cross brace 13, and may be journaled in a bicycle-like yoke (not shown) terminating at the upper end in a steering shaft 14 extending upwardly through brace 13 and rotatively journaled thereto by a bearing 15. Since neither the details of the steering gear nor specific mounting for the wheel play any part in the invention, further discussion is believed unnecessary.

The rear wheel 12 is supported by the axle 16 secured at its ends to the opposite sides of the frame. A power source 17 (internal combustion, electric or otherwise) is supported on a platform 18 also secured to and carried by the frame. The power source has driving connection with the rear wheel through a drive shaft 19 and transmission 20. It will be understood that conventionally, clutch and other drive controls will be provided for engaging and disengaging the power source from the rear wheel. Again, however, these play no part in the invention and, consequently, further details will not be given. The power source is also adapted to continuously drive a hydraulic pump P having its inlet end connected with the reservoir R through line 21. Hydraulic fluid supplied by pump P is utilized to operate the stabilization apparatus now to be described.

The principal component of the stabilization system comprises the fly wheel or disk 22 of substantial moment of inertia having an essentially vertical spin axis and supported in a gimbal having the inner ring 23 and outer ring 24. The disk 22 is journaled by its shaft 22a in the upper and lower sides of the rectilinear inner gimbal ring 23. The opposite ends of ring 23 carry trunnion pins 23a which in turn are journaled in suitable diametrically opposed apertures or bearings carried by the outer gimbal ring 24. The outer ring is provided with diametrically opposed trunnion pins 24a and 24b which are journaled in suitable apertures or bearings formed or carried by upstanding side plates 25 and 26. As is conventional in gimbals, the pivot axes of the inner and outer rings defined by the respective trunnion pins 23a, 23b, and 24a and 24b intersect at right angles. The axis of trunnion pins 23a, 23b is transverse of the vehicle with the axis of pins 24a, 24b, aligned with the normal straight line path of the vehicle.

The gyro disk and supporting gimbal structure is carried by a carrier structure C which, as will subsequently be made clear, is shiftable laterally of the vehicle frame during operation of the system. This frame includes a pair of spaced parallel sleeves or tubes 27 and 28 which are longitudinally slidable on a pair of spaced parallel rods 29 and 30 rigidly secured at their ends to the opposite sides of the frame 10. In the illustrated embodiment the ends of rods 29 and 30 are carried by lugs 31 which in turn are welded or otherwise firmly secured to blocks 32 rigidly connected with and supported by the frame sides.

The sleeves or tube members 27 and 28 are rigidly joined to form a unitary structure by supporting webs or brace sections S. The upstanding side plates 25 and 26 are secured to the tops of the members 27 and 28, for example by welding. Consequently, it will be evident that the entire gyro unit including disk 22, gimbal rings 23 and 24, and the supporting framework therefor, including the sleeves or tubes, is shiftable transversely of the vehicle toward either side of the frame on the rods 29 and 30.

In the preferred embodiment, the force for effecting displacement of the gyro unit above described is achieved through the formation of the sleeve member 27 as a double acting cylinder embracing a normally centrally located piston 29a formed on the rod 29 (see FIG. 4). It will be understood that suitable pressure seals will be provided between the opposite ends of the cylinder and the rod so as to confine the pressure fluid within the cylinder during operation despite relative movement between the cylinder and rod.

Motive power for the gyro disk 22 is supplied by a hydraulic motor 33 which is mounted on the upper side of the inner gimbal ring 23 and whose rotor has driving connection with the axle 22a of the disk. In the present embodiment of the invention motor 33 will be considered as driving the disk in a clockwise direction as viewed in FIGS. 3 and 4. The hydraulic system for motor 33 will be described in conjunction with the over-all hydraulic system which is shown in schematic form in FIG. 4, and to some extent in FIG. 3.

The outer gimbal ring 24 is operably connected with a valve control lever 34 (FIGS. 3 and 4) through the medium of an arm 35 and an adjustable link composed of a hydraulic cylinder 36 and coacting piston having the extending piston rod 37a. The lever 34 is pivoted by a pin 38 to the side of the upstanding side member 25. One end of the link cylinder 36 pivotally connects with the lower end of lever 34 through the medium of a clevis and pin connection 39. The piston rod 37a is provided on its free end with a yoke or clevis 40 which is pivotally pinned as by pin 41 to the distal end of arm 35. The arm 35 is keyed to trunnion pin 24b of the outer gimbal ring 24, this pin extending sufficiently beyond the outside of side member 25 in which it is journaled to permit mounting of the arm thereon.

Also forming a part of the hydraulic control system, and the purpose of which will presently be explained, is a pivotal pendulum-like arm 42 having the arm portion 42a and weight 42b. The arm portion 42a is pivoted to a cantilevered mounting bracket 44 which extends inwardly from and is secured to one side of the vehicle frame 10. The pivot axis for the arm 42 is indicated at 43, this being a pin or other suitable means for pivotally connecting the arm 42 to the mounting bracket 44. The pivot axis is parallel with the normal straight line path of the vehicle and, obviously, the pendulum-like arm will be influenced by centrifugal forces resulting from transition of the vehicle from a straight to a curved path, that is, moving into and during a turn. As will subsequently be shown, arm 42 controls certain valves in the hydraulic system.

The hydraulic system can probably best be understood by referring jointly to FIGS. 3 and 4. The pump P discharges into the main pressure line 45 through a one-way check valve 46 interposed therein. It will be understood that for the most part the lines of the hydraulic system are flexible. Fluid is transmitted from line 45 to the gyro motor 33 through a branch line 48. A continuation 49 of line 45 connects the pump through an accumulator 47 with one side of each of a pair of plunger type, normally closed valves 50 and 51 through branch lines 49a and 49b. A further extension 52 from line 49 connects the pressure source with one side of a second pair of plunger type, normally closed valves 53 and 54, respectively. Valves 50 and 51 are located adjacent and are controlled by the lever 34, while valves 53 and 54 are adjacent and are controlled by the pendulum-like arm 42.

The main return line to the reservoir R is indicated by reference numeral 55. This line is also connected with valves 50, 51 and 53, 54. The connection to valves 50, 51 is through branches 55a, 55b, respectively, while extension 56 and branches 56a and 56b connect the main return line with the valves 53 and 54.

The motor 33 is provided with a return outlet 57 which is connected through a valve 58 to a line 59 which joins with the main return line 55. Referring to FIG. 5, it will be seen that valve 58 may be a plunger type valve having the plunger 60 provided with the ports 60a and 60b. So long as the pump-accumulator is supplying working pressure to the system, plunger 60 is maintained in the position shown in FIG. 5 by the line pressure from the source, this being communicated to the end of the plunger through branch line 48a. Thus, the motor outlet 57 is connected with line 59 through port 60a. However, a plunger spring 61 continuously biases the plunger toward the left end of the valve cylinder and upon decrease in line pressure below the desired working limit causes the plunger to shift, thereby connecting the line 57 with a short branch line 62 which joins the pressure line 49. The advantage provided by this arrangement will be taken up in detail during description of the operation.

Returning now to a more detailed consideration of valves 50, 51 and 53, 54, the corresponding valves of these pairs are substantially identical with one another. In FIG. 6 I have shown in schematic section valves 50 and 51 and it will be understood that the description thereof applies generally to valves 53 and 54, valve 53 being like valve 50 and valve 54 like 51.

Each valve 50, 51 has a pair of through ports which are controlled by plungers 50a, 51a which have confronting ends lying on opposite sides of and adjacent the distal end of the lever 34. The plungers are similarly ported and are normally maintained in the line closing position illustrated in FIG. 6 by plunger springs 50b, 51b. It will be evident that upon limited movement of lever 34 from its central position to the left (as viewed in FIG. 6) a flow path through the valve will be opened between line 49a and a departing line 63. Also, line 55a will be connected with a line 64. During opening of valve 50, valve 51 remains closed. If lever 34 moves from its central position to the right, plunger 51a is displaced inwardly to open a flow connection between line 49b and a departing line 65 and between line 55b and a line 66. In this case, valve 50 remains closed, blocking flow therethrough.

One of the principal purposes served by the operation of valves 50 and 51 is to supply pressurized fluid to one or the other ends of the cylinder 27 and at the same time provide for relief flow from the opposite end so that the cylinder will be moved longitudinally of the support rods 29 and 30 carrying with it the entire carrier C and gyro mechanism previously described.

For example, assuming that valve 50 is opened, pressure fluid will be communicated through lines 49a, 63 and 67 to the left hand end of cylinder 27, while a relief path will be opened from the right end of the cylinder through lines 68, 64 and 55a to return line 55. Conversely, if instead valve 51 is opened, pressure fluid will be supplied to the right end of cylinder 27 through lines 49b, 65 and 68, while a relief path is opened from the left end of the cylinder through lines 67, 66 and 55b to return line 55. In other words, viewing the arrangement as shown in FIG. 3, opening of valve 50 tends to institute movement of cylinder 27 (and with it the entire gyro assembly supporting structure) toward the far side of the frame 10, while opening of valve 51 causes the cylinder and its connected structure to tend to move toward the near side.

The valves 53 and 54 operate in much the same fashion to control the condition of the link cylinder 36. Movement of pendulum arm 42a to the left of center shifts plunger 53a of valve 53 and opens communication between pressure line 52a and the left end of cylinder 36 through lines 69 and 70. The opening of the valve 53 also establishes a relief path from the right end of cylinder 36 through lines 71, 72 and 56a to return line 55. On the other hand, if arm 42a moves to the right, valve 54 is opened rather than valve 53. In this instance the pressure source is connected with the right end of cylinder 36 through lines 52b, 73 and 71, while a relief path from the left end is provided through lines 70, 74 and 56b.

Further control means for the gyro system in the form of a third pair of valves 75, 76 is located on the top of the inner gimbal ring 23. As shown in FIG. 7, located between the valve bodies is a central cylindrical casing 77 which forms a cage for a ball or sphere S which is of substantial weight in relation to the valve plungers of the valve. The casing is supported on the gimbal with its longitudinal axis disposed normal to the pivot axis of the gimbal, that is, normal to the axis of trunnion pins 23a. Light weight springs 75b, 76b urge the plungers 75a, 76a of the valve toward the ball and serve to maintain it centrally of the casing so long as the casing remains horizontal. However, any substantial departure of the axis of the casing and valve bodies from the horizontal is accompanied by gravity displacement of the ball S and opening of one or the other of valves 75 or 76, which one depending on the direction of tilt.

Pressure fluid from the pressure source is applied to one port of each of the valves 75, 76 through lines 45, 49 and branches 78 and 78a.

When valve 76 is opened, pressure fluid moves through that valve into line 79 which connects with line 68 and the right end of cylinder 27. A return path from the left end of the cylinder simultaneously opens through lines 67, 80, 81 and 59 to main return line 55.

On the other hand, opening of valve 75 establishes communication between the pressure line 45 and the left end of cylinder 27 through lines 49, 78, 82, 80 and 67. Relief from the cylinder through valve 75 when the latter is open follows the path defined by lines 68, 79, 83, 84 and 59 to main return line 55.

In describing the operation of the invention it will be assumed that the vehicle is standing in balanced condition with the power source 17 running and operating the pump P to supply the necessary operating pressure to the hydraulic lines. It will further be assumed that the weight of the vehicle and its components is so distributed that the gyro assembly is centered on rods 29 and 30, that is, its center of gravity equidistant from the sides of the frame when the vehicle frame is horizontal and balanced. Thus, cylinder 27 is centered on its piston 29a. Furthermore, the piston 37 in the link cylinder 36 is at the midpoint of the cylinder as shown in FIG. 4. The spin axis of the gyro disk 22 is vertical as shown. In the condition being described, valves 50 and 51, 53 and 54, and 75 and 76 are all closed, and the lever 34, pendulum 42 and ball S are centered between the respective valves which they control. It will further be understood that the lines and cylinders of the hydraulic system are all full of fluid.

Under the conditions just described and with the static forces exerted by the weight of the vehicle remaining unchanged, the vehicle will remain in a horizontal attitude, any tilting to one side or other of the fore and aft axis being prevented by the resistance of the gyro axis to displacement from the vertical. It will be understood, of course, that the moment of inertia of the gyro disk 22 and its rate of rotation must be such as to well exceed that which will maintain the vehicle in balance. These parameters will vary with the over-all weight of the vehicle and distribution thereof and also the degree of static balance of the frame, such as that afforded by the engagement of the supporting wheels with the ground or other running surface. This can readily be calculated by those skilled in the art for any particular vehicle.

Should the vehicle have an unbalancing force applied thereto, that is, one which tends to tilt the vehicle from the horizontal toward one side or the other of the fore and aft horizontal support axis (the axis X—X of FIG. 1 defined by the contact points between wheels 11, 12 and the ground); whether occurring by side wind load, centrifugal force, weight shifting within the vehicle, or added to the frame on either side of the center, or any force applying a torque on the frame tending to move the frame from its stabilized attitude, then the system compensates therefor in the following fashion.

For purposes of illustration, assume that a downward force W (FIG. 3) is applied to the far side of the frame. This creates an unbalancing moment tending to tilt the far side of the frame downwardly, and the frame will accordingly start to move in this direction, carrying with it the gyro wheel and supporting structure.

It will be noted, however, that the gyroscopic force resulting from the spin of disk 22 holds the outer gimbal ring 24 from tilting with the frame and thus crank arm 35 will be restrained against pivotal movement, although it will be displaced laterally. The small initial displacement of the frame thus causes the link 36, 37a to pull against the lower end of lever 34 at connection 39, causing the lever to be displaced clockwise as viewed in FIG. 4. This is because the horizontal component of displacement of the gimbal shaft 24b exceeds that of the lever pin 38. The pivotal displacement of lever 34 opens the ports of valve 51 and thus causes pressure fluid to be applied to the right end of cylinder 27 through line 68 with the concurrent opening of a relief path through line 67. As a result, the gyro carrier and gyro, that is, the gyro assembly, is shifted toward the near side of the vehicle or in a direction to counteract the torque created by the force W. This movement will continue so long as valve 51 remains open. The valve closes again when the counteracting moment exerted by the gyro assembly reaches a value equal to that exerted by the weight W, that is, when the torque on crank arm 35 is removed.

As will be understood by those versed in gyrodynamics, the initial torque applied to the gimbal through arm 35 also has the effect of causing the gyro spin axis to precess, displacing the inner gimbal in the direction shown by arrow 100 of FIG. 3. As the gyro tips, ball S of the precession valve assembly 75, 76 is urged by gravity in a direction to open valve 76. This serves to connect the pressure source with the right end of cylinder 27 through line 79, and to open a relief path from the left end through line 80. It will therefore be evident that even though the force W is equalized by shifting of the gyro assembly as previously described, the cylinder 27 will be operated to shift it past the equilibrium point through the medium of valve 76 when the gyro precesses.

The continued movement of the cylinder is only that sufficient to apply a slight reverse torque to crank arm 35 and thus cause lever arm 34 to open valve 50. Upon the opening of valve 50 the pressures inside cylinder 27 on the opposite sides of piston 29a will be equalized since both ends of the cylinder are connected with a pressure line and a return line. The right end of cylinder 27 connects with return line 55 through lines 64 and 55a, thus providing a bypass for pressure fluid coming through line 79 from valve 76. The left end of cylinder 27 still is connected with return line 59 through lines 68 and 80, valve 76 and line 81 which also provides a path for pressure fluid moving through valve 50 and line 63. Accordingly, the equalization of pressures on opposite sides of the piston results in stabilization of the cylinder at this point. The slight reverse torque which is exerted on the crank arm due to overshifting of the cylinder is sufficient to cause reverse precession to the vertical.

Under operating conditions in which the unbalancing torque applied to the frame is opposite from that caused by force W, the balancing or stabilization results from the opening of valve 50 rather than 51. For example, under the influence of a force W–1 (FIG. 3) applied to the near side of the frame, the link 36, 37a is put in compression rather than tension, thus causing the distal end of lever 34, at the outset, open valve 50, leaving valve 51 closed. The pressure source is thus connected with the left end of cylinder 27 through lines 49, 49a, 63 and 67, while the relief path leads from the right end of the cylinder through lines 68, 64 and 55a to return line 55. Likewise, precession of the gyro spin axis is in the direction of arrow 101, resulting in opening of valve 75 rather than 76. Thus, the gyro assembly follows the same pattern of operation as that described in connection with force W, except that in this instance the movement is in the reverse direction until the frame is stabilized.

It should be apparent that once the frame is stabilized any change in the force pattern tending to again unbalance it will result in corresponding movement of the gyro assembly in a direction to counteract the particular change.

For example, if force W is increased following stabilization, valve 51 is again opened, resulting in further displacement of the gyro assembly toward the near side of the frame until the increase is compensated for. Likewise, if force W is, in net effect, decreased, then the gyro assembly will move toward the far side under the control of valve 50, the distance necessary to shift its center of gravity to the proper balancing position. The gyro precession will reflect the torque supply to the crank arm 35, thus resulting in proper opening and closing of the precession valves 75 and 76.

It should be understood that in the preceding description whenever reference has been made to the departure of the frame from its horizontal attitude, the increment of movement is quite small in relation to the over-all size of the vehicle. Only enough movement is required as to actuate the valves 50 and 51. Throughout the operation, as thus far described, the spin axis of the gyro disk 22 remains in a substantial vertical plane and the frame of the vehicle remains substantially horizontal. Thus, up to this point, the pendulum arm 42a has remained substantially vertical and has played no part in the operation.

Assume now, however, that the vehicle is subjected to centrifugal force, as will occur during a turn or any change in direction of advance. This produces, generally speaking, two results. The first is the application of an unbalancing torque on the vehicle tending to depress that side of the frame on the outside of the turn (as if a force W or W–1, depending on the direction of the turn, is applied to the frame). The second is that the centrifugal force acting on pendulum 42 will cause the latter to depart from its vertical gravity stabilized position, bringing into play one or the other of valves 53 and 54, which one depending on the direction of the turn. An example may assist in understanding the function served by the pendulum.

Let us assume that the vehicle is making a left-hand turn as it is moving forward. The centrifugal force acting on the vehicle as a whole can be visualized as that caused by weight W of FIG. 3. The application of this force causes the gyro assembly to shift toward the inside of the turn in the same manner as described above. Simultaneously the pendulum 42 is caused to swing outwardly from the vertical, or toward valve 53, thus opening same through the depressing of valve plunger 53a. This has the effect of connecting pressure line 52a with line 70 and return line 56a with line 72 to line 71.

As valve 53 is opened, pressure fluid is supplied to the left end of the link cylinder 36, thus in effect shortening the link between crank arm 35 and lever arm 34, due to shifting the piston 37 to the right in the cylinder. Since arm 35 is held stationary by the spinning gyro, a tension force will be applied to the lower end of the lever and transmitted to the frame of the vehicle through lever pivot pin 38. Stop 34b prevents lever 34 from turning past a limiting position. As a consequence, the vehicle frame will be caused to shift relative to the crank arm 35, the shift resulting in a lean of the vehicle inwardly on the turn.

It will be evident that as the vehicle leans, the pendulum pivot 43 will shift relative to the ground, as will the valves 53 and 54. The pendulum has a stabilized position, for any degree of curve and speed therethrough, which is achieved when the moment about the pivot point 43, due to the displacement of the center of gravity from a vertical line through the pivot, is equal to the counter moment caused by the centrifugal force acting on the pendulum. Obviously, when the vehicle reaches an angle of leaning inclination in which the values 53 and 54 are again equidistant from the arm 42a, valve 53 will close and the link 36, 37a will be locked into its new lengths. From this time on the torque valves 50, 51 will be operated as before by the lever 34 to compensate for any changes in torque applied to the vehicle and to stabilize the vehicle in the leaning attitude.

It will be understood that the maximum length of link 36, 37a will be determined by the maximum lean desired. In considering the operation I am assuming that the degree to which the vehicle is leaned is within the achievable maximum since it will be evident that the maximum should be at the limit of safety for the vehicle.

The vehicle will assume the leaning position until centrifugal force is either increased or decreased as would occur during a sharper turn or as a result of increased speed, or a lesser turn or decreased speed. As the centrifugal force is decreased, the pendulum proceeds back toward the vertical. Since the vehicle is in a leaning position the pendulum will thus move toward valve 54 and depress its plunger, thus opening communication from pressure line 52b to lines 73, 71 and between lines 70, 74 to return line 56b. Pressure fluid now enters the left end of the link cylinder 36 and serves in effect to pull the frame back toward the crank arm 35 or toward its original horizontal attitude. At the same time the decrease in centrifugal force is causing the gyro assembly to shift in response to opening of valve 51.

In the case where the vehicle is negotiating a right turn, the procedure is essentially the reverse of that described above. In this case, the initial valve opened by the pendulum is valve 54 and the link between arm 35 and lever 34 is shortened, thus to draw the pivot pin 38 and frame toward the crank arm 35. Leaning of the vehicle continues until valve 54 again opens, whereupon the unit is stabilized in the proper attitude for the particular turn being negotiated.

Upon return of the vehicle to the straight path the pendulum swings back against the plunger of valve 53 causing the pressure fluid to again be applied to the right end of cylinder 36 and return of the frame to its horizontal attitude.

As should by now be apparent, at any given time during the operation the balance or torque control assembly, which includes the lever 34 and valves 50 and 51, operates at all times to balance moments tending to tilt the vehicle to one side or the other. This will occur simultaneously with the operation of the attitude changing mechanism embodying the pendulum 42. Since the effect of leaning the vehicle is to alter the moment system acting on the frame, the lever 34 will act in accordance with the changing moment to shift the movable weight represented by the gyro assembly to compensate therefor without changing the leaning attitude.

By providing for a controlled and rapid leaning of the vehicle during turns, I have overcome one of the principal obstacles to previous stabilization systems in moving vehicles of which I am aware. Through such an arrangement passengers are able to ride in greater comfort in that they are subjected to considerably less swaying forces than as in the case of vehicles where the stabilizing force is supplied by the gyro wheel alone. Moreover, by providing for controlled lean of the vehicle during turns the safety of the vehicle has been materially improved since it results in a lower center of gravity during negotiation of curves and turns.

In the preferred embodiment the hydraulic system is such that the gyro motor 33 can effectively take over and supply pressure fluid to the control components in the event of loss of operating pressure at the pump.

The inertia of the rapidly spinning gyro serves to continue the rotation of the motor rotor. Should there be a drop in pressure below the desired limit, valve 58 is actuated by spring 61 to connect line 57 on the discharge side of the motor with line 62 through port 60b. The fall-off in pressure at line 48 permits the necessary shifting of plunger 60 to effect connecting line 57 with 62.

As is evident, line 62 connects with the pressure line 49 which in turn leads to the various valves. A back check valve 90 prevents loss of pressure to the intake side of the motor 33. Line 45 now becomes a pressure supply line, the bypass 91 and check valve 92 permitting fluid to be drawn from the reservoir R as needed through lines 45 and 48 to the motor. Obviously, should there by a complete loss of power at the engine 37, eventually the gyro motor will become ineffective to continue operation. However, the time interval provided permits of bringing the vehicle to a halt. While not shown, auxiliary landing gear may be included on the frame to prop the vehicle in an upright condition when the gyro system is stopped or before it is started.

The mounting of the gyro wheel in the gimbal support insures that the vehicle can ascend and descend grades without affecting the position of the gyro wheel axis in space. The outer ring 24 will simply pivot relative to the gyro wheel on the axis defined by pins 23a.

While acceleration and deceleration may cause momentary opening of the precession valves 75, 76, their effect is immediately neutralized by the slight shift of the carrier C occasioned thereby and the concurrent effect on valves 50, 51 through lever 34. These valves serve to immediately stop any movement of the carrier initiated by valves 75 and 76.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention I claim:

1. A dynamically stabilized body comprising a chassis supported for rocking movement about a horizontal support axis and having a first position with respect to said axis, a spinning gyro wheel having a normally vertical spin axis, a gimbal carrying said gyro wheel, one axis of the gimbal being parallel with said support axis, carrier means for said gimbal mounting said gimbal on the chassis for translation thereof to either side of said support axis, link mechanism connecting a point on said carrier means with said gyro wheel and operable to sense any angular displacement of said point relative to said spin axis caused by a rocking moment tending to rock said chassis about said support axis away from said first position, and means connected with and operated by said link mechanism in response to said angular displacement to cause translation of said carrier in a direction to counterbalance said rocking moment and apply a righting moment to said body.

2. A dynamically stabilized body as in claim 1 including means operable to return said spin axis toward its substantially vertical position following translation of said carrier to an equilibrium position with respect to said body and said rocking moment.

3. A dynamically stabilized body as in claim 1 including leaning means operable to positively change the attitude of said chassis relative to said gyro spin axis in response to the application to the body of a substantially horizontal centrifugal force directed transversely with respect to said support axis.

4. A dynamically stabilized body comprising a chassis supported for rocking movement about a substantially horizontal support axis and having a first position with respect to said axis, a spinning gyro wheel having a normally vertical spin axis and disposed above said support axis, a gyro carrier on said chassis including a gimbal for the gyro wheel, said gimbal having an outer ring journaled for rotation relative said carrier about a first axis parallel with said support axis and an inner ring connected with said outer ring for rotation with respect thereto about a normally horizontal axis intersecting said first axis, said inner ring connected with and journaling said gyro wheel on said spin axis, link mechanism connecting a point on said carrier remote from said first axis with said outer ring and operable to apply a torque to said gyro wheel upon rocking movement of said chassis away from said first position whereby to initiate precession of said gyro wheel, means controlled by said link mechanism and operable in response to said torque to alter the weight distribution of said body and shift the center of gravity thereof in a direction relative to said support axis to relieve the torque on said gyro wheel and halt precession of said gyro wheel, and means actuated responsive to said precession to effect return of the gyro spin axis to its vertical position.

5. A dynamically stabilized body as in claim 4 wherein said gyro carrier is mounted for translation on said chassis, and wherein said means controlled by said link mechanism is operably connected with said carrier to shift same in order to achieve said alteration of the weight distribution.

6. A dynamically stabilized body as in claim 4 including means actuated responsive to a centrifugal force acting substantially horizontally and transversely of said support axis for positively displacing said point on said chassis relative to said gyro wheel whereby to cause said chassis to change its attitude relative to said gyro wheel and to lean in a direction opposite from said force.

7. A dynamically stabilized body comprising a chassis supported for rocking movement about a substantially horizontal support axis and having a first position with respect to said axis, a spinning gyro wheel having a normally vertical spin axis and disposed above said support axis, a gyro carrier on said chassis including a gimbal for the gyro wheel, said gimbal having an outer ring journaled for rotation relative said carrier about a first axis parallel with said support axis and an inner ring connected with said outer ring for rotation with respect thereto about a normally horizontal axis intersecting said first axis, said inner ring connected with and journaling said gyro wheel on said spin axis, means supporting said carrier from said chassis for reciprocal translation of said carrier transversely of said support axis, power means selectively operable to effect translation of said carrier, link mechanism connecting one point on said carrier with said outer ring and operable to cause a torque to be applied to said outer ring about said one axis in response to a moment applied to said body tending to rock same away from said first position, and means controlled by said link mechanism and operable to activate said power means in response to the occurrence of said torque whereby to cause translation of said carrier toward a position in which it will create a righting moment about said support axis.

8. A dynamically stabilized body as in claim 7 wherein said link mechanism includes a crank arm connected with said outer ring and extending laterally with respect to said first axis, and a link member pivotally connected at one end with said arm and connected at the other end with said point.

9. A dynamically stabilized body as in claim 8 wherein said link member is constructed to be selectively lengthened and contracted and including means operable to effect said lengthening or contracting in order to change the spacing of said point from said outer ring and thus the attitude of said carrier and chassis with respect thereto.

10. A dynamically stabilized body as in claim 9 wherein said power means includes a hydraulic cylinder disposed to act between said carrier and frame and a source of pressurized fluid, and wherein said means controlled by said link mechanism includes valve means operable to communicate fluid from said source to said cylinder.

11. A dynamically stabilized body as in claim 9 wherein said link member includes a hydraulic cylinder and piston, and including a source of pressurized fluid, said means operable to effect lengthening or contracting comprising a valve controlling fluid flow to said cylinder.

12. A dynamically stabilized body as in claim 11 including a member sensitive to the existence of centrifugal force acting on the body in a generally horizontal direction transverse to said support axis and displaceable by said force, said last-mentioned member being operably connected with said valve.

13. A dynamically stabilized body comprising a chassis supported for rocking movement about a horizontal support axis and having a first position with respect to said axis, a spinning gyro wheel having a normally vertical spin axis, means mounting said gyro wheel on the chassis including a gimbal support for the gyro wheel, sensing means connecting a point on said chassis with the spin axis of the gyro wheel and operable to detect and define relative movement between said point and said spin axis occurring as said chassis is rocked away from said first position by a moment applied to said chassis, means connected with and operated by said sensing means responsive to said relative movement to cause the weight distribution of said body to be altered in a direction to produce a righting moment about said horizontal axis counteracting the applied moment, force sensing means connected with said body and displaceable responsive to a generally horizontal centrifugal force applied to said body transverse to said horizontal axis, and means controlled by said force sensing means and operable to positively lean said chassis with respect to said spin axis in a direction opposite to that of said centrifugal force.

14. A dynamically stabilized body comprising a chassis supported for rocking movement about a horizontal support axis and having a first position with respect to said axis, a spinning gyro wheel having a normally vertical spin axis, a gyro carrier on said chassis including a gimbal for the gyro wheel, said gimbal having an outer ring journaled for rotation relative said chassis about a first axis parallel with said support axis and an inner ring connected with said outer ring for rotation with respect thereto about a normally horizontal axis intersecting said first axis, said inner ring connected with and journaling said gyro wheel on said spin axis, link mechanism extending between a point on said carrier and said outer ring and operable to sense any angular displacement of said point relative to said spin axis caused by a rocking moment tending to rock said chassis about said support axis away from said first position and to directly connect said chassis with the outer ring upon said displacement whereby to impose the resistance to movement of the gyro wheel on the chassis while initiating free precession of the gyro wheel, and means operably connected with and actuated by said link mechanism responsive to said angular displacement to alter the weight distribution of said body and shift the center of gravity thereof in a direction relative to said support axis to counterbalance said rocking moment and apply a righting moment to said body.

15. A dynamically stabilized body as in claim 14 wherein said link mechanism includes an extensible and retractable link member and means for effecting extension and retraction of said link member to selectively change the attitude of said chassis with respect to a vertical plane containing said support axis.

16. A dynamically stabilized body comprising a chassis carrying a spinning gyro wheel having a substantially vertical spin axis, means supporting said chassis for rocking movement about a horizontal support axis and for translation along an initial path generally aligned with said support axis but capable of effecting turning of the vehicle from said path, pendulum means supported from the chassis and operable to reflect centrifugal force acting on the chassis and caused during turning, means connecting said gyro wheel with said chassis and controlled by said pendulum means and operable to lean said chassis inwardly of the turn during the turn and return said chassis to the upright condition when straight line advance is resumed, and means operable to shift said gyro wheel inwardly of the turn simultaneously with the inward leaning of the chassis.

References Cited in the file of this patent

UNITED STATES PATENTS

| | | |
|---|---|---|
| 991,485 | Darrow | May 9, 1911 |
| 1,137,234 | Schilowsky | Apr. 27, 1915 |
| 1,590,977 | Henderson | June 29, 1926 |
| 1,947,119 | Walter | Feb. 13, 1934 |
| 1,986,845 | Napier | Jan. 8, 1935 |
| 2,961,877 | Edwards | Nov. 29, 1960 |